United States Patent [19]

Rysti

[11] 4,195,737

[45] * Apr. 1, 1980

[54] METHOD AND APPARATUS FOR HANDLING ELONGATED ARTICLES, SUCH AS PIECES OF TIMBER

[76] Inventor: Alpo Rysti, Frisansintie 22, 02240 Espoo 24, Finland

[*] Notice: The portion of the term of this patent subsequent to Mar. 28, 1995, has been disclaimed.

[21] Appl. No.: 888,868

[22] Filed: Mar. 22, 1978

Related U.S. Application Data

[63] Continuation-in-part of Ser. No. 744,882, Nov. 24, 1976, Pat. No. 4,081,088.

[30] Foreign Application Priority Data

May 4, 1977 [FI] Finland .................................. 771420

[51] Int. Cl.$^2$ ............................................. B65G 47/19
[52] U.S. Cl. .................................... 209/521; 198/418; 414/41; 414/77; 414/276; 414/786
[58] Field of Search .................. 214/6 DK, 16 B, 152; 209/517–521; 198/452, 565, 569, 418, 535; 414/41, 57, 77, 786, 276

[56] References Cited

U.S. PATENT DOCUMENTS

| | | | |
|---|---|---|---|
| 1,784,273 | 12/1930 | Constable | 198/565 X |
| 3,116,835 | 1/1964 | Brandon | 214/16 B X |
| 3,155,245 | 11/1964 | Brandon | 214/16 B |
| 3,231,104 | 1/1966 | Lawrence | 222/66 X |
| 3,361,272 | 1/1968 | Carroll | 214/6 DK |
| 4,081,088 | 3/1978 | Rysti | 214/16 B X |

*Primary Examiner*—L. J. Paperner

*Attorney, Agent, or Firm*—Steinberg and Blake

[57] ABSTRACT

A method and apparatus for handling elongated articles, such as elongated pieces of timber of different types, includes a plurality of compartments for receiving the articles of the different types with each compartment receiving only one type of article. A plurality of inclined partitions define the several compartments between themselves with each partition having an upper surface down which elongated articles received in a compartment can slide. An upper conveyor conveys the articles past top open ends of the compartments while suitable selecting structure selects articles from the upper conveyor to deflect articles of a given type therefrom into a given compartment. A releasable holding structure adjacent at the bottom end of the plurality of partitions holds the articles deposited in the compartments to prevent the articles from sliding out of lower open ends of the compartments, with the articles deposited in each compartment forming therein a single layer on the upper slide surface of a partition. A lower conveyor extends across bottom open ends of the several compartments and the releasable holding structure can be actuated by suitable controls to release a layer of articles from a given compartment to slide down a partition onto the lower conveyor, the latter delivering the articles in the form of a single layer to a device such as a timber packaging device which requires the articles to be delivered thereto in the form of a single layer, so that in this way the latter device can receive the articles directly from the lower conveyor onto which the articles are deposited from the compartments only in the form of a single layer.

12 Claims, 3 Drawing Figures

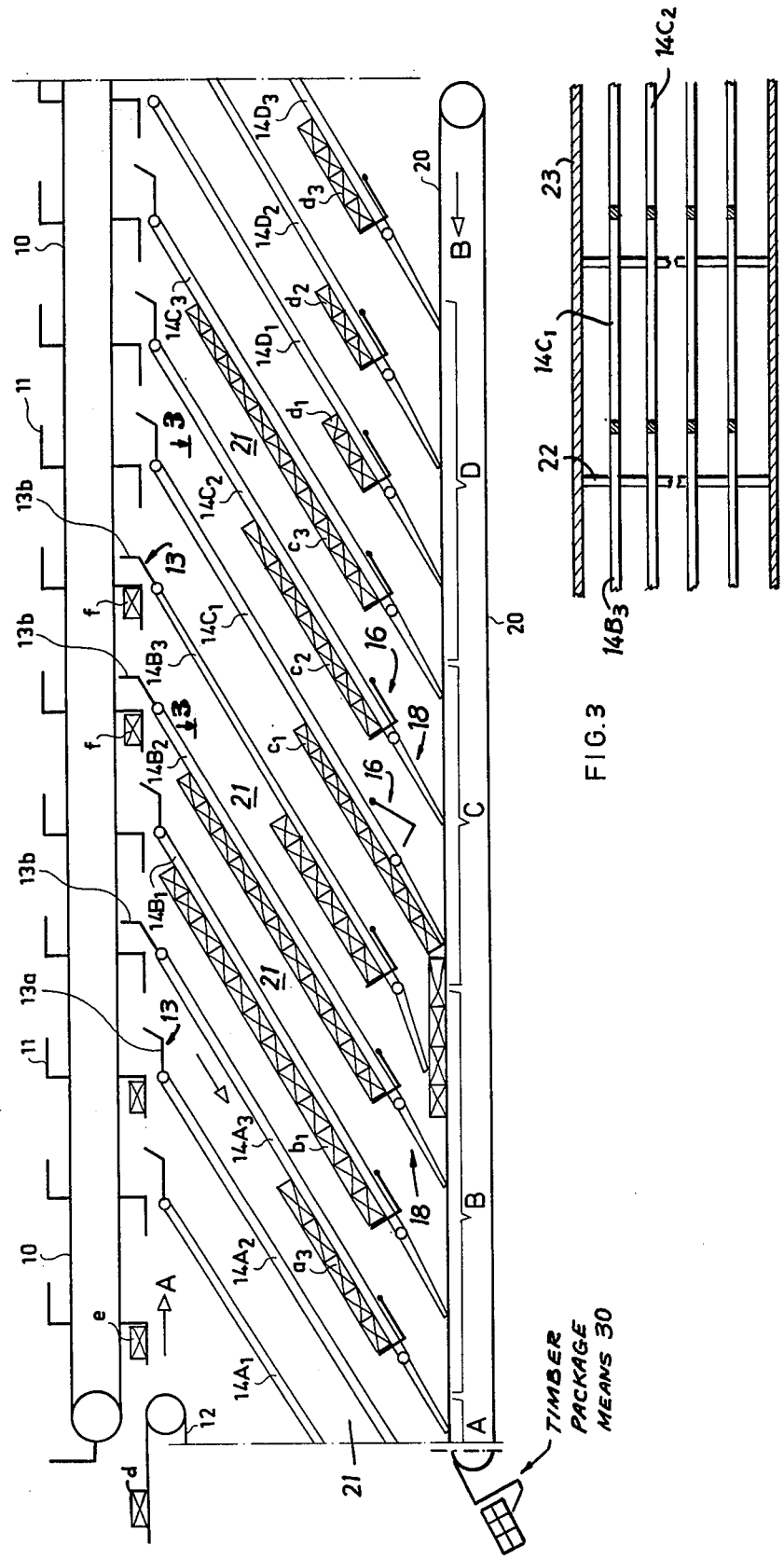
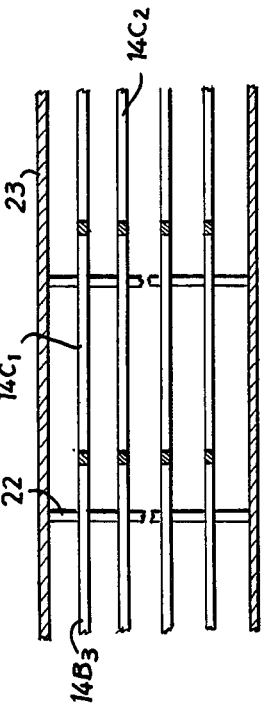
FIG. 1
FIG. 3

METHOD AND APPARATUS FOR HANDLING ELONGATED ARTICLES, SUCH AS PIECES OF TIMBER

CROSS REFERENCE TO RELATED APPLICATION

This application is a continuation-in-part of application Ser. No. 744,882, filed Nov. 24, 1976 now U.S. Pat. No. 4,081,088.

BACKGROUND OF THE INVENTION

The present invention relates to methods and apparatus for handling elongated articles such as elongated pieces of timber, particularly pieces of timber of different types.

With known methods and apparatus for handling articles of the above type, the articles are separated according to quality and/or size, such as length, and in accordance with this separation articles of a given type are delivered to a given compartment. Thus a relatively large number of consecutive sorting compartments are arranged for respectively receiving articles, and the articles generally are simply dropped from an upper conveyor into a particular compartment which is intended to receive articles of a given type, these compartments being arranged, for example, in groups according to which all of the compartments in a given group receive articles of a given type. When a given quantity of articles has been collected in a given compartment or group of compartments, this quantity of articles is delivered, primarily by gravity, out of the compartments onto a conveyor situated beneath the compartments to be transported by the conveyor to a location where the articles are further handled, as, for example by being packaged.

In the case where there are at least two consecutive sorting compartments belonging to a given group for receiving a given type of article, the opening of these sorting compartments and the emptying thereof is carried out according to a given program which may be preset to give a certain starting command according to which the compartments of the given group are successively opened in a given sequence for locating the articles in a desired manner on the lower conveyor to be delivered thereby to a device such as a packaging device. Preferably that compartment of a given group which is nearest to the discharge end of the lower conveyor is first opened to release the articles therefrom, and then the next compartment is opened, and so on.

One of the important requirements of methods and apparatus for handling articles such as timber is that the method and apparatus be capable of handling the articles in such a way that they are not damaged. For example in the case of elongated pieces of timber, it is important that they be handled in such a way that the corners thereof are not damaged. In this respect the above application provides a notable improvement over prior art methods and apparatus, particularly due to the fact that it is possible with the above patent application to utilize relatively small sorting compartments capable of being opened and emptied according to a given program in such a way that damage to the timber pieces can be decreased to a considerable extent from what has been heretofore encountered.

SUMMARY OF THE INVENTION

It is a primary object of the present invention to provide a method and apparatus which will further develop the concepts disclosed in the above patent application and which will widen the range of application thereof.

Thus it is an object of the present invention to provide a method and apparatus according to which articles of the above type can be handled in such a way that damage thereto, particularly damage to the corners of pieces of timber, can be markedly decreased as compared to prior art methods and apparatus.

In addition, it is an object of the present invention to provide a method and apparatus capable of assuring that the articles delivered from the compartments onto a lower conveyor form on the latter only a single layer of the articles so that when the articles are delivered from the lower conveyor to a device, such as a packaging device, which requires the articles to be received by the device in the form of a single layer, such articles can be delivered directly from the lower conveyor to the device without requiring the use of an intervening mechanism for seperating the articles into a single layer prior to delivery to the device which requires the articles to be received thereby in the form of a single layer. Thus, if the articles are delivered from the compartments onto the lower conveyor in a form according to which several layers of articles are formed one above the other on the lower conveyor, then when the device for receiving the articles from the lower conveyor requires the articles to be received in the form of a single layer, it is necessary first to separate the articles discharging from the lower conveyor in such a way that they will form a single layer prior to being received by the device for further treating the articles, such as a packaging device.

Furthermore it is an object of the present invention to provide a method and apparatus of the above type which are relatively simple and inexpensive while at the same time operating reliably to achieve the desired results.

Thus, it is an specific object of the present invention to provide a method and apparatus according to which the pieces of timber can be caused to form a continuous organized single layer or mat upon the lower conveyor, so that special dispersing pockets or other structure corresponding thereto are no longer required subsequent to the lower conveyor in order to separate the articles to form a single layer therefrom. Instead the sawed pieces of timber may be conveyed directly from the lower conveyor to the packaging apparatus.

In order to achieve the above objects as well as others which will become apparent, the invention is mainly characterized in that sorting compartments which receive the timber pieces from an upper conveyor have inclined sliding planes on each of which a single layer of articles in the form of a timber mat is assembled.

According to the invention the articles are dropped from an upper conveyor into a series of compartments according to the particular type of article, and these compartments are defined by a plurality of partition means which are inclined so as to have upper sliding surfaces forming the above slide planes. As the articles drop into a given compartment they become assembled on such a sliding plane formed by the upper surface of the partition means, and in this way a single layer of the articles is formed on each partition means. A releasable holding means can be operated according to a given control system for releasably holding a layer of articles on each partition means until the layer assumes a given size, and then the entire layer can be released to slide down the partition means on to a lower conveyor which delivers the articles in the form of a single layer directly to a device such as a packaging device.

BRIEF DESCRIPTION OF DRAWINGS

The invention is illustrated by way of example in the accompanying drawings which form part of this application and in which:

FIG. 1 is a schematic side elevation of one possible embodiment of a method and apparatus according to the invention;

FIG. 3 is a fragmentary sectional plan view taken along line 3—3 of FIG. 1 in the direction of the arrows for further illustrating the construction of the partition means between which several compartments of the invention are formed.

DESCRIPTION OF PREFERRED EMBODIMENTS

Figure 2:
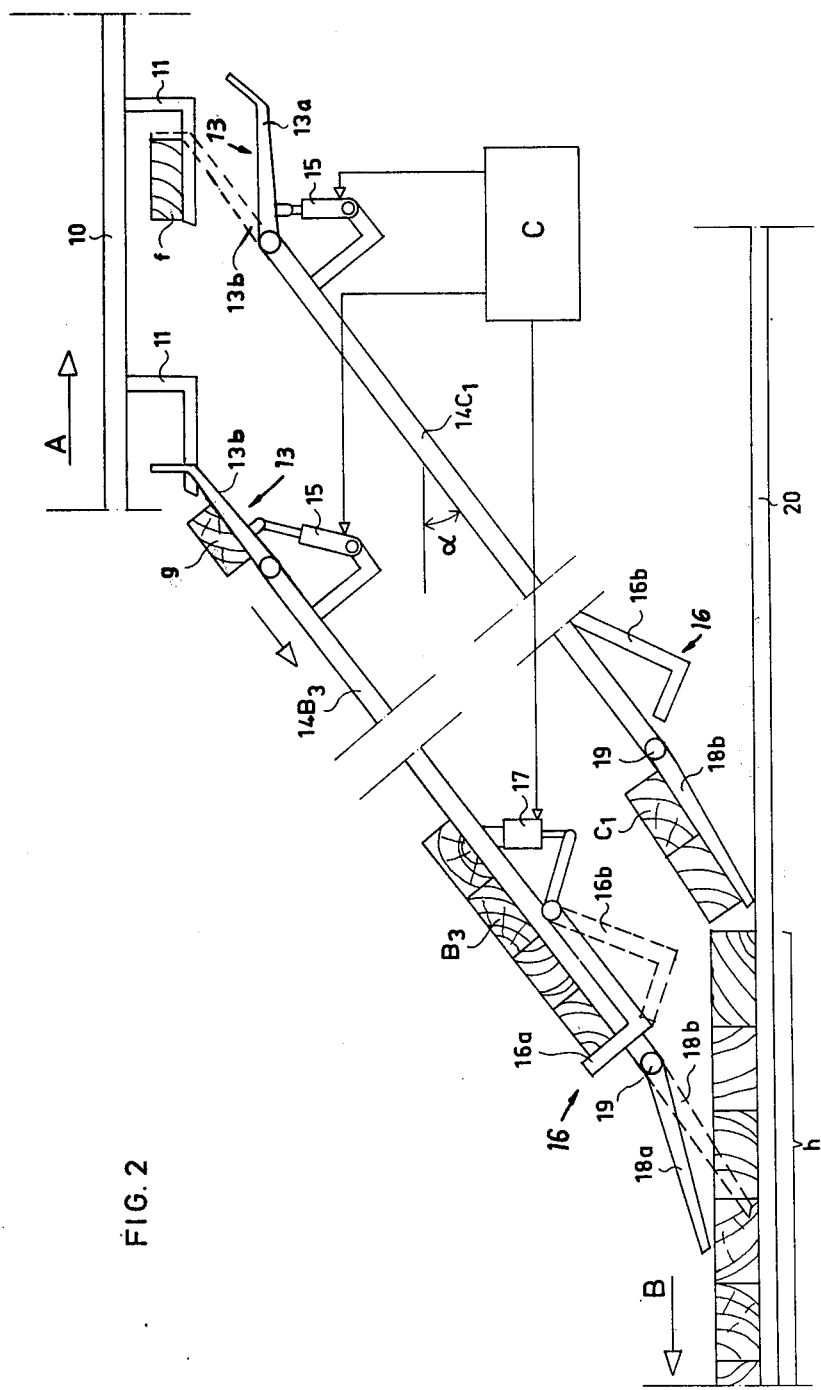
FIG. 2 schematically illustrates part of the structure of FIG. 1 at a scale larger then FIG. 1 with FIG. 2 showing certain features of the invention in greater detail.

Referring now to FIG. 1 it will be seen that the timber-sorting installation illustrated therein includes an upper conveyor means 10 composed of elongated endless chains or belts guided around suitable sprockets or pulleys with these chains or belts carrying the substantially L-shaped members 11 which are adapted to receive and carry the elongated articles which in the illustrated example are in the form of elongated pieces of timber d. These timber pieces d are delivered in a suitably dosed or metered manner from a supply conveyor 12 to the upper conveyor means 10. Thus the operation of the conveyor means 10 and the conveyor means 12 is carried out in such a way that these conveyors have with respect to each other a suitably timed relation according to which as each timber piece d reaches the right discharge end of the conveyor 12, as viewed in FIG. 1, each timber piece d will be deposited onto two or more transversely aligned L-shaped members 11. Thus it will be understood that behind each of the members 11 shown in FIG. 1 there is at least one additional member 11 spaced therefrom, these members 11 travelling through spaces defined between the chains or belts of the conveyor 12 as well as through spaces between the spockets or pulleys on which these chains or belts are guided, and the speed of the conveyor 12 has with respect to the speed of the conveyor 10 a relationship according to which each piece d will be reliably deposited upon a least a pair of transversely aligned members 11. Thus FIG. 1 shows an elongated timber piece e which has just been received from the conveyor 12 and which is being conveyed to the right by the lower run of the conveyor means 10, in the direction of the arrow A, previously delivered timber pieces f also being shown in FIG. 1 as they travel across the upper open ends of a series of compartments of the invention.

These compartments 21 take the form of spaces defined between a plurality of parallel inclined partition means. Thus FIG. 1 illustrates a plurality of partition means $14A_1$, $14A_2$, $14A_3$, which define between themselves compartments 21 of a group A of compartments. The next following partition means $14B_1$, $14B_2$, $14B_3$, define between themselves three compartments 21 forming the group B. In the same way the next plurality of partition means $14C_1$, $14C_2$, $14C_3$, forms the group C of compartments 21, and the following partition means $14D_1$, $14D_2$, $14D_3$, forms the group D of compartments. If desired this arrangement can be extended to form any desired number of compartments and any desired arrangement of groups of compartments.

As is shown schematically in FIG. 3, the structure includes a pair of opposed parallel upright walls 23 which fixedly carries rods 22 extending horizontally between the walls 23, and these rods 22 pass through suitable openings in a number of bars, FIG. 3 illustrating one group of bars forming the partition means $14B_3$, the next group of bars forming the partition means $14C_1$, and the following group of bars forming the partition means $14C_2$. In this way it is possible to provide the several partition means illustrated in FIG. 1 all extending parallel to each other and all being inclined in the same direction with the several partition means being spaced equidistantly from each other.

Thus it will be seen that the several partition means have upper ends all situated at the same elevation and spaced from each other to define upper open ends for the compartments 21, while the several partition means also have lower ends located at the same elevation and defining between themselves open lower ends of the several compartments 21. Moreover, the upper ends of the several partition means are displaced horizontally with respect to the lower ends thereof so that the several partition means are inclined with respect to a vertical plane, as illustrated in FIG. 1.

The several aligned bars which form each partition means terminate in upper surfaces which are situated in a common plane, forming a slide plane having an inclination which is such that timber pieces on this slide plane are capable of sliding freely as a result of gravitational forces downwardly along the particular slide plane formed by the upper surface of each partition means.

In order to cause particular pieces of timber of a given type to be received in a given compartment, each partition means has operatively connected to its upper end a selecting means 13 in the form of two or more rods having the configuration illustrated in the drawings and pivotally connected to the top ends of two or more bars which form a partition means. These rods which form a selecting means 13 for a given compartment are interconnected by a transverse bar which in turn is pivotally connected to the piston rod of a fluid-pressure piston-and-cylinder means 15 pivotally supported by a suitable bracket fixed to a partition means as shown for the partition means $14B_3$ and $14C_1$ of FIG. 2. The several selecting means 13 are capable of being turned between their lower rest positions 13a and upper selecting positions 13b illustrated in the drawings. For this purpose a suitable control means C is operatively connected with the several fluid-pressure means 15 in the manner shown schematically in FIG. 2. Thus, the pieces of timber d will be sorted according to size, for example, this size being detected for example, by suitable photosensitive means such as a photoelectric means or the like, and this latter means will actuate the control means C to cause a given selecting means 13 to be turned from its lower rest position 13a to its upper deflecting position 13b when a given piece of timber f of a given type has arrived at a compartment to which it is to be delivered. Thus FIG. 1 shows a pair of selecting means 13 in their upper positions 13b to deflect a pair of timber pieces f onto the pair of partition means $14B_2$ and 14B$_3$. In the same way FIG. 2 shows the timber piece g after it has been deflected and while it is sliding down on the partition means 14B$_3$, and the right selecting means 13 of FIG. 2 is shown in dotted lines in its upper position and in solid lines in its lower position with the right means 13 of FIG. 2 in its dotted line position being about to engage the timber piece f to deflect the latter onto the partition means 14C$_1$ indicated in FIG. 2. FIG. 2 also indicates the angle of inclination $\alpha$ of the several parallel partition means which will assure downward sliding movement by gravity of the several pieces of timber which rest on the upper slide planes formed by the several partition means.

It will be understood that the several rods which form each selecting means 13 move up into spaces between the L-shaped members 11 which continuously travel in the direction of the arrow A across the upper open ends of the several compartments. After a given piece of timber has been deflected into a given compartment the selecting means 13 which has brought about this deflection returns to its rest position 13a where it is situated out of the line of travel of the timber pieces.

Thus with the arrangement of the invention the groups of compartments A–D each include a successive series of three compartments in the illustrated example. Moreover, each partition means has operatively connected thereto a releasable holding means 16 which serves to releasably hold a layer of elongated articles in a particular compartment until a command is given to release the layer.

Thus, the releasable holding means 16 operatively connected to each partition means is also in the form of a series of rods these rods of being L-shaped configuration and being pivotally carried by the bars which form each partition means in a manner shown schematically in FIGS. 1 and 2. The several rods of each releasable holding means 16 are interconnected by a transverse member which is connected by a suitable lever to the piston of a fluid-pressure cylinder-and-piston means 17 also controlled by the control means C according to a predetermined program. The releasable holding means 16 operatively connected to the partition means 14B$_3$ in FIG. 2 is shown in solid lines at the position 16a which is the operative releasable holding position where the holding means 16 holds a layer of timber pieces such as the layer B$_3$ on the partition means 14B$_3$. Thus as long as the releasable holding means 16 is in its holding position 16a as shown in solid lines at the partition means 14B$_3$ in FIG. 2, the several timber pieces g which are deposited on the partition means 14B$_3$ will slide down the latter to engage the preceeding timber piece which has been deposited thereon, thus forming the layer B$_3$. The first piece of timber which is received by a given compartment will slide down the slide plane thereof to be engaged by the releasable holding means, and the successive pieces of timber deposited in a particular compartment will slide automatically by gravity down the inclined slide plane thereof to form in this way a layer of timber pieces on a given slide plane. Thus in FIG. 1 there is illustrated a completed layer b$_1$ of timber pieces on the partition means 14B$_1$ while other layers of timber pieces are shown in the process of being formed on other partition means. It will be noted that in accordance with the invention in each compartment the several pieces of timber collected therein form only a single layer or mat of timber pieces of the same type.

When a completed layer of timber pieces is to be released for moving out of a given compartment to the lower open end thereof, a command is transmitted from the control means C, according to a given program, for actuating the fluid-pressure means 17 so as to turn the releasable holding means 16 from the holding position 16a to the release position 16b shown in dotted and solid lines in FIG. 2, and now the holding means 16 will be retracted away from the particular layer which is free to slide down on the inclined slide plane onto a lower conveyor means 20 the upper run of which moves to the left, as shown by the arrow B in FIGS. 1 and 2. Thus, the several releasable holding means 16 of the several compartments are arranged to be releasable for bringing about emptying of a given group of compartments upon a command derived according to a preset program from the control means C.

The program or control means C shown schematically in FIG. 2 thus governs the operation of the releasable holding means 16 and the selecting means 13. This control means can take any known form, for example a known electronic and/or pneumatic form, utilizing designs known in themselves in the prior art.

Thus, as is shown in FIG. 2, the right selecting means 13 has been turned from the solid to the dotted line position to deflect the timber piece f so that it will slide down the upper surface of the partition means 14C$_1$. Of course immediately thereafter the selecting means 13 is returned to the position 13a. The timber piece g is shown sliding down the partition means 14B$_3$, and this sliding will continue until this piece encounters the previously delivered pieces of the mat B$_3$. This mat is of course maintained stationary by the left releasable holding means 16 shown in FIG. 2. Of course when this releasable holding means is turned to the dotted line position 16b then the mat or single layer of timber pieces will be free to slide down the inclined slide plane onto the conveyor 20. It will be noted that FIG. 2 shows at the partition means 14C$_1$ a previously completed layer or mat C$_1$ which is in the process of being received by the lower conveyor means 20. The releasable holding means 16 connected to the partition means 14C$_1$ is shown in its released position and is about to be turned back to its holding position 16a so as to stop the downward sliding movement of the next piece of timber which is just about to be deflected onto the partition means 14C$_1$. As is shown in FIG. 2 the released single layer C$_1$ of timber pieces forms a corresponding single layer on the conveyor means 20, and inclination of the several partition means is such that when the layers of timber thereon slide onto the conveyor 20, they move toward the left discharge and thereof as viewed in FIG. 1. Thus FIG. 2 shows part of a single-layer mat h of timber derived from the layer C$_1$ and already on the conveyor 20 being conveyed in the direction of the arrow B toward the discharge end of the conveyor 20. The arrangement is such that the layer from a given partition means forms a continuous layer on the conveyor 20.

As is indicated in FIG. 1, the upper sliding planes formed by the pair of partition means 14A$_1$ and 14A$_2$ are still empty while the slide plane formed by the upper surface of the partition means 14A$_3$ is being filled to form the single layer a$_3$ of timber on the partition means 14A$_3$. In the group of compartments B, the slide planes of the partition means 14B$_1$ and 14B$_2$ are already filled to capacity and the layer of timber on the partition means 14B$_3$ is in the process of being completed. This layer B$_3$ is shown in FIG. 2. The group of compartments C has already been filled and is in the process of being discharged. It will be noted in this connection that the first compartment of the group C is in the process of being discharged in the position of the part shown in FIG. 1, the layer $c_1$ of timber pieces being shown partly on the conveyor 20 and partly sliding down the partition means $14C_1$. According to a further feature of the invention when a given group of compartments is to be emptied the sequence of operation derived from the program is such that first that compartment of the given group which is nearest to the discharge end of the conveyor means 20 will be discharged, and then the next compartment, and so on. Thus when the layer $c_1$ has been discharged from the partition means $14C_1$ to a given extent, the releasable holding means connected to the partition means $14C_2$ will be actuated to release the layer $c_2$, the timing being such that the first timber piece of the layer $c_2$ will become situated directly behind the last timber piece of the layer $c_1$. In this way on the conveyor means 20 there will be formed a continuous uninterrupted layer of timber pieces of a given type derived from a series of compartments of a given group in the sequence set forth above. In a similar manner the releasable holding means 16 operatively connected to the partition means $14C_3$ will be actuated automatically to discharge the layer $c_3$ at an appropriate time which will cause the first or lower timber piece of the layer $c_3$ to become situated behind the last timber piece of the layer $c_2$, directly next thereto to form in this way a continuous layer on the upper run of the conveyor means. In the position of the part shown in FIG. 1 the several partition means $14D_1$, $14D_2$, and $14D_3$ are in the process of having the single layers $d_1$, $d_2$, and $d_3$ of timber pieces respectively formed thereon.

According to a further feature of the invention each partition means includes a lower freely swingable flap 18 which is situated just below the releasable holding means 16 for guiding the timber pieces directly onto the conveyor. Each guide flap 18 may be in the form of a single elongated sheet of material or in the form of separate bars pivotally connected separately to the several bars which form each partition means. The guide flaps 18 are pivotally connected to the lower ends of the several partition means by way of pivots 19 the construction of which is such that each guide flap 18 can freely turn upwardly to the position $18a$ shown in FIG. 2 while falling by gravity back down to the position $18b$ in which it remains by reason of the construction of the hinge 19. Thus the hinges 19 have a construction permitting each guide flap means 18 to turn freely in an upward direction by limiting the downward swinging movement thereof to an extent such that the lower end of each guide flap means 18 is situated just above the upper run of the conveyor means 20. Thus, by way of these guide flaps 18 each layer of timber is capable of sliding smoothly onto the upper run of the conveyor 20. At the same time, as a given layer of timber is conveyed by the conveyor 20, any guide flaps in the path of movement of such a layer can easily be swung up by the layer of timber itself to the upper position $18a$ as shown in FIG. 2, so that these guide flaps do not interfere with the movement of the layers of timber towards the discharge end of the lower conveyor means 20. Thus since the guide flaps 18 are freely turnable in an upward direction, the timber mat h on the upper end of the conveyor 20 is able to pass forwardly beneath the several compartments to the discharge end of the conveyor means 20.

The several sliding planes formed by the upper surfaces of the bars which form the several partition means of course have a relatively low coefficient of friction with respect to the timber pieces. For this purpose the several bars of each partition means may be suitably coated particularly at their upper surfaces with a plastic material which is relatively slippery so that the friction retarding the downward sliding movement of the timber pieces is reduced to be as low as possible. As a result of this feature it is possible to make the angle of inclination $\alpha$ of the sliding planes relatively small.

FIG. 1 schematically illustrates at the left discharge end of the lower conveyor means 20 a timber packaging means 30. This timber packaging means 30 requires the timber pieces to be delivered thereto in the form of a single layer. Thus, with the structure of the invention because the several layers of timber will be delivered from the compartments in the form of a single layer h on the upper run of the conveyor means 20, such a single layer of timber can be delivered directly from the discharge end of the conveyor means 20 to the timber packaging means 30 without requiring any intervening structure for receiving timber pieces from the conveyor 20 and forming from these received timber pieces a single layer to be delivered to the packaging means 30.

Of course the invention is not to be narrowly confined to the details described above and given by way of example only. Such details may of course vary within the scope of the inventive concept defined by the claims which follow.

What is claimed is:

1. In a method for handling elongated articles, such as elongated pieces of timber of different types, the steps of delivering the articles to the upper open ends of compartments, said compartments being arranged in groups of compartments, each of which includes a plurality of compartments, in a manner according to which articles of only one type will be situated in compartments belonging to the same group thereof, while arranging the articles in each compartment in a single layer therein and on an inclined slide plane the inclination of which is such that the single layer of articles thereon can slide by gravity down the inclined slide plane of each compartment to be discharged therefrom out of an open bottom end thereof, releasably holding the first of a series of articles delivered to a given compartment in the latter compartment at a lower region thereof while succeeding articles of the same type are delivered to said compartment to form therein said single layer of the articles, then releasing said first article for free sliding movement out of the compartment through the open bottom end thereof with the remainder of the layer of articles in the compartment gravitationally following the said first article so that a complete single layer of the articles will discharge out of each compartment, the articles to be discharged from the compartments being released in such a way that the layers of articles in the compartments of one group are discharged sequentially one after the other from the compartments of said one group according to a given program, the articles being discharged from the compartments of said one group in a manner such that the compartment of said one group which is nearest to the discharge end of a conveyor beneath the compartment has the layer of articles therein first discharged therefrom, and thereafter the next following compartment of the particular group is discharged, receiving the discharged layers on a conveyor situated beneath the compartments adjacent to the open bottom ends thereof, and discharging the layers thus received on the conveyor from a discharge end of the conveyor to a device for further treating the articles discharged from the conveyor.

2. In a method as recited in claim 1 and wherein the inclination of the layers of articles in the compartments is such that when a given layer slides downwardly out of a given compartment it moves toward the discharge end of the conveyor beneath the compartments during the downward sliding of each layer out of the given compartment.

3. In a method as recited in claim 1 and wherein the device receiving the articles from the discharge end of the conveyor beneath the compartments requires the articles to be delivered thereto in the form of a single layer, and discharging the layers of the articles from the compartments in such a way that the articles received on the conveyor beneath the compartments form a single layer thereon, so that the device can receive a single layer of articles directly from the conveyor beneath the compartments without requiring any intervening steps to form a single layer from articles received from the conveyor beneath the compartments.

4. In a method as recited in claim 1 and including the step of conveying the articles initially over and across the upper open ends of the compartments, and when an article belonging to a given compartment reaches the upper open end thereof, interrupting the conveying of the latter article beyond the the latter compartment and instead causing the particular article to be dropped into the compartment to which it belongs.

5. In an apparatus for handling elongated articles, such as elongated pieces of timber of different types, a plurality of partition means defining between themselves and plurality of compartments for receiving the articles, wherein the plurality of compartments are arranged in groups with each group including a plurality of compartments for receiving articles of the same type, said plurality of partition means respectively having upper ends all located at substantially the same elevation and lower ends all located at substantially the same elevation with said upper ends of said partition means defining between themselves upper open ends of the compartments while the lower ends of the partition means define between themselves lower open ends of the compartments, and all of said partition means being inclined with respect to a vertical plane with each partition means having its upper end horizontally displaced with respect to its lower end, so that each partition means has an upper inclined surface onto which an article falls when dropping through the upper open end of each compartment into the interior thereof, the upper inclined surfaces of the several partition means slidably engaging the articles which are dropped into the compartments through the upper open ends thereof and having an inclination for respectively forming slide planes down which the articles can slide by gravity toward the open lower ends of the compartments, so that as each article is dropped into a given compartments it engages an upper inclined surface of a partition means and tends to slide down the latter inclined surface toward the lower open end of the particular compartment, a plurality of releaseable holding means respectively connected operatively to the plurality of partition means adjacent the lower ends thereof for engaging and releasably holding, at a region adjacent to the lower open end of each compartment, the first of a series of articles dropped into each compartment and sliding down the upper inclined surface of the partition means, so that when a series of articles are dropped one after the other into a given compartment, the series of articles will form on an inclined surface of the partition means a single layer of articles situated in the particular compartment on the slide plane thereof and held therein by the releasable holding means of the particular compartment, upper conveyor means for conveying elongated articles across the upper open ends of the compartments, a plurality of selecting means such situated at the region of the upper end of each partition means and operatively connected thereto for selecting an article of a given type to be received in a given compartment, the plurality of selecting means normally having rest positions situated beyond the path of movement of articles past the upper ends of the compartment while being movable from said rest positions to selecting positions situated in the path of movement of a particular article to prevent the latter article from continuing to move with the upper conveyor means and instead deflecting the latter article from the upper conveyor means to be removed therefrom and deposited on the upper inclined surface of the partition means to slide downwardly thereon toward the lower end of a particular compartment, control means operatively connected with the plurality of selecting means and with the plurality of releasable holding means for controlling the plurality of selecting means to select particular articles of a given type for each compartment and for controlling the plurality of releasable holding means to bring about release of a layer of articles of a given type on a given partition means for sliding movement downwardly along the given partition means out of a particular compartment through the lower open end thereof, and lower conveyor means extending across the open lower ends of the compartments for receiving articles discharged out of a compartment when a layer of articles is released by releasable holding means for sliding movement out of a particular compartment, said lower conveyor means conveying a layer of articles received from a compartment to a device situated adjacent a discharge end of said lower conveyor means for further treating the articles, said control means being further operatively connected with the plurality of releasable holding means for releasing the articles from a given group of compartments one after the other from the compartments of a given group in a manner forming on the lower conveyor means a single layer of articles received successively from the compartments of a given group and in such a way that the articles are first released from that compartment of a given group which is nearest to the discharge end of said lower conveyor means, and then from the next compartment of the particular group.

6. The combination of claim 5 and wherein all of said partition means are inclined in the same direction.

7. The combination of claim 6 and wherein all of said partition means are parallel to each other.

8. The combination of claim 7 and wherein the several partition means are spaced equidistantly from each other.

9. The combination of claim 5 and wherein the several partition means are all inclined in the same direction, and the latter direction being such that as a given layer of articles slides down a partition means onto the lower conveyor means when released by the releasable holding means operatively connected to the latter partition means, the particular layer of articles sliding down the latter partition means moves downwardly along the latter partition means toward the discharge end of the lower conveyor means.

10. The combination of claim 5 and wherein the several partition means are all inclined in the same direction with the latter direction being such that as a given layer of articles slides down a partition means out of the given compartment the said layer of articles travels downwardly along the particular partition means toward the discharge end of said lower conveyor means, and the several partition means respectively carrying at the lower end regions just below the releasable holding means a plurality of swingable flap means respectively terminating in lower edges adjacent said lower conveyor means and nearer thereto than the thickness of said articles, the plurality of flap means being freely swingable upwardly away from the lower conveyor means so that when a given layer of articles is conveyed by said lower conveyor means past lower flap means of partition means which are situated in the path of movement of a given layer of articles on the lower conveyor means, the layer of articles itself will be capable of displacing the lower flap means situated in advance of a layer of articles upwardly away from the latter while the layer of articles is conveyed by the lower conveyor means toward the discharge end thereof.

11. The combination of claim 5 and wherein the plurality of partition means cooperate with the lower conveyor means for depositing thereon only a single layer of articles released from the compartments by the releasable holding means in response to operation of the control means, and the device situated at the discharge end of the lower conveyor means being that type of device which requires articles to be delivered thereto in the form of a single layer, so that the articles can be delivered directly to the device from the lower conveyor means in the form of a single layer.

12. The combination of claim 11 and wherein the device is a timber packaging means.

* * * * *